No. 652,818. Patented July 3, 1900.
D. SVENSON.
GRAIN ERECTING ATTACHMENT FOR HARVESTERS.
(Application filed Mar. 22, 1900.)
(No Model.) 2 Sheets—Sheet 1.

Witnesses.
Robert Otto.
Harry Kilgera

Inventor:
Daniel Svenson.
By his Attorneys.
Williamson & Merchant.

No. 652,818. Patented July 3, 1900.
D. SVENSON.
GRAIN ERECTING ATTACHMENT FOR HARVESTERS.
(Application filed Mar. 22, 1900.)

(No Model.) 2 Sheets—Sheet 2.

Witnesses.
Robert Otto
Harry Kilgore

Inventor.
Daniel Svenson
By his Attorneys
Williamson & Merchant

United States Patent Office.

DANIEL SVENSON, OF TWIN VALLEY, MINNESOTA.

GRAIN-ERECTING ATTACHMENT FOR HARVESTERS.

SPECIFICATION forming part of Letters Patent No. 652,818, dated July 3, 1900.

Application filed March 22, 1900. Serial No. 9,659. (No model.)

*To all whom it may concern:*

Be it known that I, DANIEL SVENSON, a citizen of the United States, residing at Twin Valley, in the county of Norman and State of Minnesota, have invented certain new and useful Improvements in Grain-Erecting Attachments for Harvesters; and I do hereby declare the following to be a full, clear, and exact description of the invention, such as will enable others skilled in the art to which it appertains to make and use the same.

My invention has for its object to provide an improved and efficient grain-erecting attachment or device for harvesters adapted to act upon fallen grain to lift the same into a position in which it may be cut by the machine.

To the above ends my invention consists of the novel devices and combinations of devices hereinafter described and defined in the claims.

The invention in its preferred form is illustrated in the accompanying drawings, wherein—

Figures 1, 3:
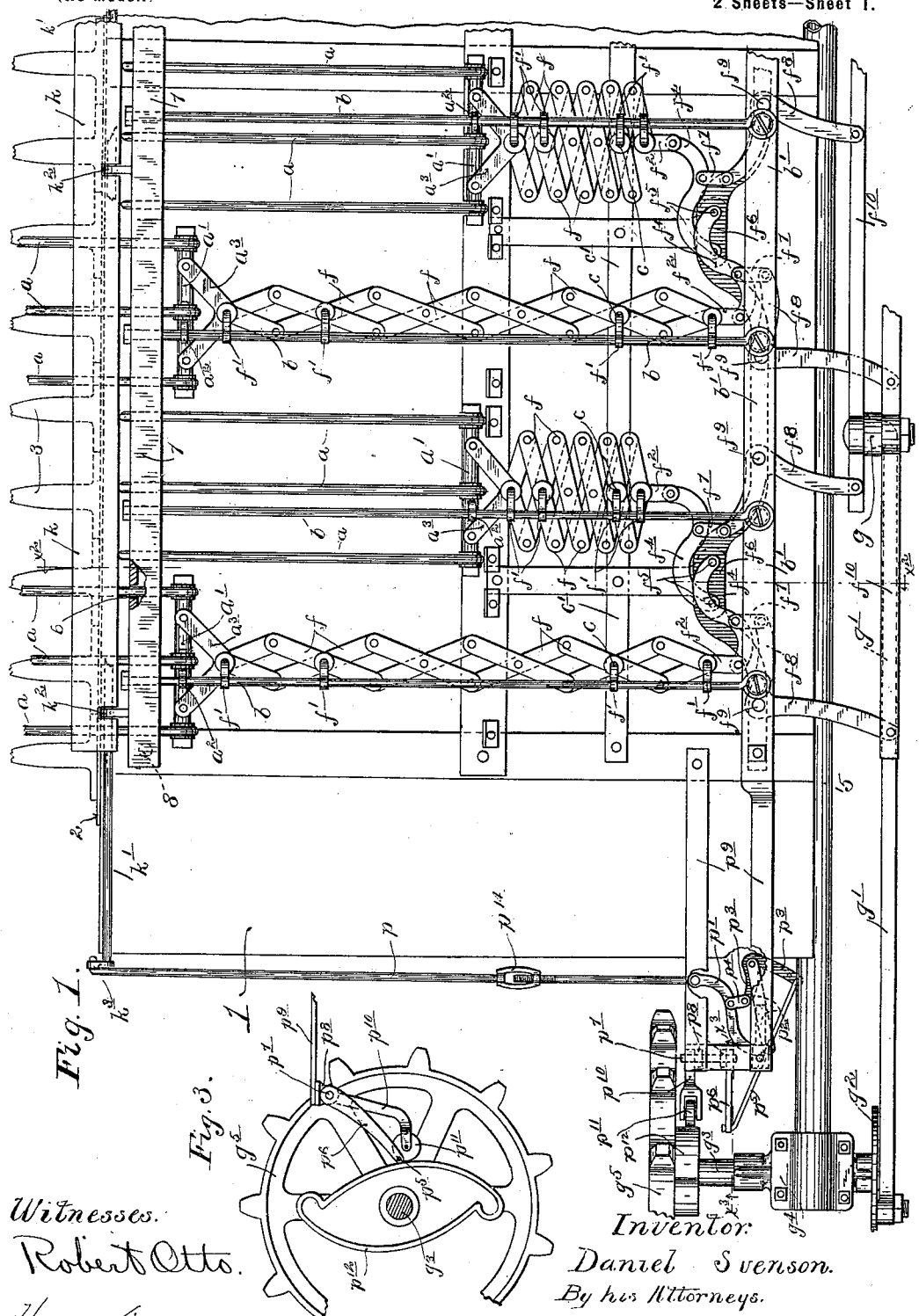
Figure 2:
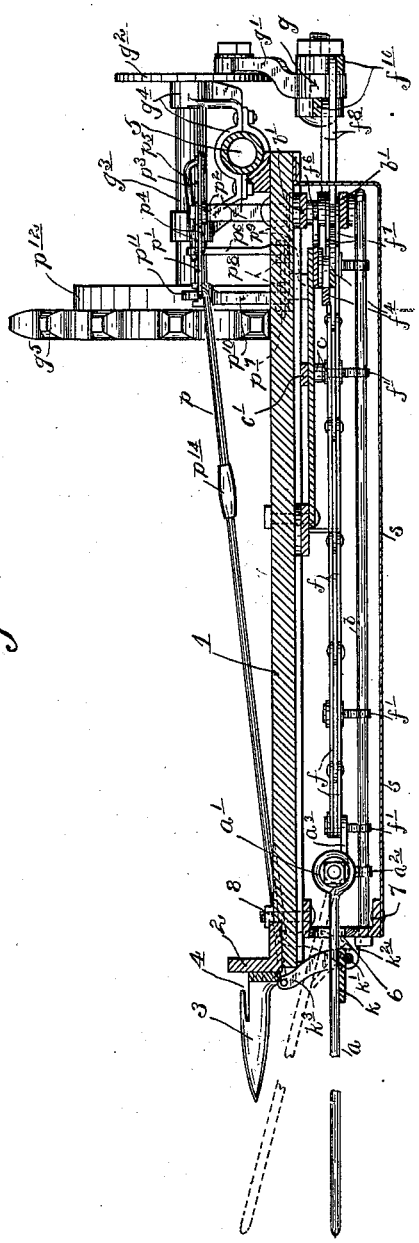

Figure 1 is a bottom plan view of the platform portion of a harvester having applied to the under side thereof my improved grain-erecting attachment, some parts being broken away and others removed. Fig. 2 is a vertical section taken approximately on the line $x^2$ $x^2$ of Fig. 1, and Fig. 3 is a detail in transverse section on the line $x^3$ $x^3$ of Fig. 1.

The numeral 1 indicates the platform, the numeral 2 the finger-bar, the numeral 3 the sickle-guides, the numeral 4 the sickle-seat, and the numeral 5 a frame portion of the platform-section, of an ordinary grain-harvester.

It is a well-known fact that with a harvester of ordinary construction it is impossible to cut fallen grain, and it is also a known fact that a great amount of grain is wasted for the reason that it cannot be thus cut. My improved device or attachment involves a plurality of lifting-fingers which are reciprocated or projected forward of the sickle in close proximity to the ground and are then arranged to elevate or lift the grain into nearly or quite an erect position or, at least, into a position where it may be engaged by the reel and directed to and cut by the sickle.

The invention in its preferred form will now be described specifically; but it will of course be understood that so far as the broad idea of my invention is concerned many of the actuating devices for the said grain lifting or erecting fingers may take various forms.

In the drawings the lifting or erecting fingers are indicated by the letter $a$, and, as shown, they are connected in groups of three, each group being pivotally connected to a reciprocating head or bar $a'$ and mounted to work through vertical slots 6 of a channel-bar 7, secured longitudinally to the forward under side of the platform 1 by means of nutted bolts 8 or other suitable devices. The heads $a'$ in turn have guide-eyes $a^2$, that slide freely on guide-rods $b$, which rods extend below the platform 1 from front to rear of same and are secured at their front ends to the channel 7 and at their rear ends to longitudinal supporting-bars $b'$, which in turn are supported from the deck 1. The reciprocating heads $a'$ also have angular extensions or brackets $a^3$, to which the forward joints of lazy-tong levers $f$ are pivotally attached. The said lazy-tongs $f$ have at several of their joints guide-eyes $f'$, that support them from but permit them to slide on the guide-rods $b$, and they are fulcrumed at $c$ to bars $c'$. At their rear joints lazy-tongs $f$ are shown as connected by short links $f^2$ to the free ends of levers $f^4$, that are pivoted at $f^5$ to supporting-brackets $f^6$, projected from the supporting-bars $b'$. Short links $f^7$ connect the intermediate portion of the levers $f^4$ to the inner arms of bell-cranks $f^8$, that are pivoted at $f^9$ to the supporting-bars $b'$. The outer arms of alternate bell-cranks $f^8$ are connected to common connecting-bars $f^{10}$, and hence alternate reciprocating heads $a'$ are moved simultaneously in the same direction. However, it will be noted that adjacent bell-cranks $f^8$ are turned in reverse directions and are so connected that when one of the lazy-tongs $f$ is extended the adjacent lazy-tongs will be contracted. In other words, when alternate groups of the lifting-fingers $a$ are projected the intermediate alternate groups will be withdrawn, and vice versa. The connecting-bars $f^{10}$ are both connected to the head $g$ of a long pitman $g'$, which is driven by a crank-disk $g^2$, carried by a short counter-shaft $g^3$, which is mounted in a bearing $g^4$, shown as secured to one end of the platform-tube 5. The counter-shaft $g^3$ is driven from a sprocket-chain (not shown) which runs over a sprocket-wheel $g^5$ on said shaft and over another sprocket-wheel driven by the binder or any other suitable part of the harvester.

A lifting-blade $k$, which is pivoted on a rod $k'$, supported from the forwardly-projected lugs $k^2$ of the channel-bar 7, extends immediately under all of the lifting-fingers $a$, just forward of the said channel-bar 7. This lifting-blade $k$ supports the free ends of all of the lifting-fingers $a$ and when raised throws the projecting fingers upward, as indicated by dotted lines in Fig. 2. This raising movement of the lifting-blade is given to the same twice under each rotation of the shaft $g^3$ and crank-disk $g^2$ and at such times as the groups of fingers are alternately thrown forward in position to engage in under and lift the fallen grain. The above movements of the lifting-blade $k$ are imparted through the following connection: The projecting end of the shaft $k'$, which carries the blade $k$, is provided with a crank-arm $k^3$, to which one end of a link or rod $p$ is pivoted, the other end of said rod being pivoted to a lever $p'$, which is pivoted to a bracket $p^2$, which is supported by one of the bars $b'$. $p^3$ indicates a bell-crank which is also pivoted to the bracket $p^2$ and is connected by a short link $p^4$ to the intermediate portion of the lever $p'$. The other arm of the bell-crank $p^3$ is connected by a rod $p^5$ to an arm $p^6$ of a short counter-shaft $p^7$. The counter-shaft $p^7$ is mounted in suitable bearings $p^8$, secured to a bracket $p^9$, projected from one of the bars $b'$ and from the deck 1. At its other end the counter-shaft $p^7$ has an arm $p^{10}$, provided at its free end with a roller $p^{11}$, which is subject to a cam $p^{12}$, carried by a shaft $g^3$. This cam $p^{12}$ has diametrically-opposite cam projections $p^{12}$, that act upon the roller $p^{11}$ of the arm $p^{10}$ and through the connections described serve to raise the lifting-blade $k$ and then to suddenly drop the same to quickly return the lifting-fingers $a$ to their lowered position. A turnbuckle $p^{14}$ in the connecting-rod $p$ permits of adjustments to properly set the lifting-blade $k$ for action on the fingers $a$.

To protect the mechanism secured beneath the platform 1, a light metallic case $s$ is secured at its forward edge to the channel-bar 7 and is extended rearward and then upward and secured to the deck 1.

In the drawings only a portion of the harvester deck or platform is shown; but it will of course be understood that the deck may be of any length and that the grain erecting or lifting fingers and actuating devices would be extended the full length of the cutter-bar. It will also be understood that the invention above described is capable of a large range of modification. The mechanism above described, however, has been applied to a harvester and has been found to perform its work satisfactorily.

What I claim, and desire to secure by Letters Patent of the United States, is as follows:

1. The combination with a harvester, of a plurality of lifting-fingers mounted for approximately-horizontal reciprocations, and means for projecting said fingers forward of the sickle-bar and then elevating them while projected, to lift the falling grain, substantially as described.

2. The combination with a harvesting-machine of reciprocating and pivotally-mounted lifting-fingers projecting forward of the cutter-bar, and a lifting blade or bar extended beneath said fingers and having connections for lifting the same, substantially as described.

3. The combination with a harvester, of a plurality of lifting-fingers and means for projecting them forward of the cutter-bar, of a pivoted lifting-blade extended below said fingers and operating to raise the same when projected, substantially as described.

4. The combination with a harvesting-machine, of reciprocating fingers pivoted in groups to heads or carriers, lazy-tongs connections to said heads or carriers, and means for operating the said lazy-tongs, substantially as described.

5. The combination with a harvesting-machine, of reciprocating lifting-fingers pivoted in groups to heads or carriers lazy-tongs, connections to said heads or carriers, and means for extending and contracting adjacent lazy-tongs in alternate order, substantially as described.

6. The combination with a harvester, of reciprocating lifting-fingers pivoted in groups to reciprocating heads or carriers, lazy-tongs connections for reciprocating alternate heads or carriers in reverse order, a lifting-blade pivoted below the free portions of said lifting-fingers, and means for operating the said blade to lift said fingers while projected forward of the cutter-bar, substantially as described.

7. The combination with a harvesting-machine, of the lifting-fingers $a$ pivoted to the heads $a'$, the lazy-tongs $f$ operating said heads $a'$, the guide-rods $b$ serving to support and guide said lazy-tongs $f$, the bell-crank and intermediate lever connections to said lazy-tongs, the crank and pitman connection to said bell-cranks, the pivoted lifting-blade $k$ underlying the lifting-fingers $a$, a cam for operating said blades, and lever connections between said cam and said blade operating substantially as described.

In testimony whereof I affix my signature in presence of two witnesses.

DANIEL SVENSON.

Witnesses:
C. ANDERSON,
J. L. WALD.